United States Patent
Ito (10) Patent No.: US 6,676,400 B2
(45) Date of Patent: Jan. 13, 2004

(54) CONTROL UNIT OF A MOTOR FOR AN INJECTION MOLDING MACHINE

(75) Inventor: Akira Ito, Chiba (JP)

(73) Assignee: Nokia Corporation, Espoo (FI)

(*) Notice: Subject to any disclaimer, the term of this patent is extended or adjusted under 35 U.S.C. 154(b) by 13 days.

(21) Appl. No.: 09/925,741

(22) Filed: Aug. 10, 2001

(65) Prior Publication Data

US 2002/0018823 A1 Feb. 14, 2002

(30) Foreign Application Priority Data

Aug. 11, 2000 (JP) ........................................ 2000-244119
Aug. 11, 2000 (JP) ........................................ 2000-244169

(51) Int. Cl.$^7$ ............................................... B29C 45/77
(52) U.S. Cl. ...................... 425/145; 318/801; 318/812; 425/149; 425/150
(58) Field of Search ................................ 425/145, 149, 425/150; 318/801, 812

(56) References Cited

U.S. PATENT DOCUMENTS 4,446,416 A * 5/1984 Wanlass ...................... 318/812
5,705,909 A * 1/1998 Rajashekara ................. 318/801

FOREIGN PATENT DOCUMENTS

| JP | 62-044063 | 2/1987 |
|---|---|---|
| JP | 62100191 | 5/1987 |
| JP | 04-105583 | 4/1992 |
| JP | 07-298685 | 10/1995 |
| JP | 11262293 | 9/1999 |
| JP | 2000004596 | 1/2000 |
| JP | 2000-041392 | 8/2000 |

* cited by examiner

Primary Examiner—Tim Heitbrink
(74) Attorney, Agent, or Firm—Squire, Sanders & Dempsey L.L.P.

(57) ABSTRACT

First and second three-phase inverters having self-diagnosing circuits are connected to three-phase windings of a three-phase double-winding type motor, respectively, and first and second servo controllers having self-diagnosing circuits are connected to the three-phase inverters, respectively. When an abnormality occurs in the three-phase inverter or the servo controller, the occurrence of the abnormality is signaled to the servo controller. When abnormality occurs in the three-phase inverter or the servo controller, the occurrence of the abnormality is signaled to the servo controller, thereby stopping rotation of the motor.

19 Claims, 8 Drawing Sheets

CONTROL UNIT OF A MOTOR FOR AN INJECTION MOLDING MACHINE

BACKGROUND OF THE INVENTION

1. Field of the Invention

The present invention relates to a control unit of a motor for an injection molding machine, in particular, to a control unit for controlling a servo motor used for a motor-driven injection molding machine or a hybrid molding machine.

2. Description of the Related Art

Drive methods of an injection molding machine are broadly classified into hydraulic and motor drive methods. While previously the hydraulic method had been mainly used, the motor drive method has now become more common. This is attributable to features of the motor drive method including a high rigidity of the power transmission mechanism, good ability to control position and speed of the movable parts, and a high energy conversion efficiency. However, the hydraulic method has a feature permitting easy and accurate force control of the driving section, that is unavailable in the motor drive method. A hybrid method has therefore been developed which combines the motor and the hydraulic drive methods.

Figure 1:
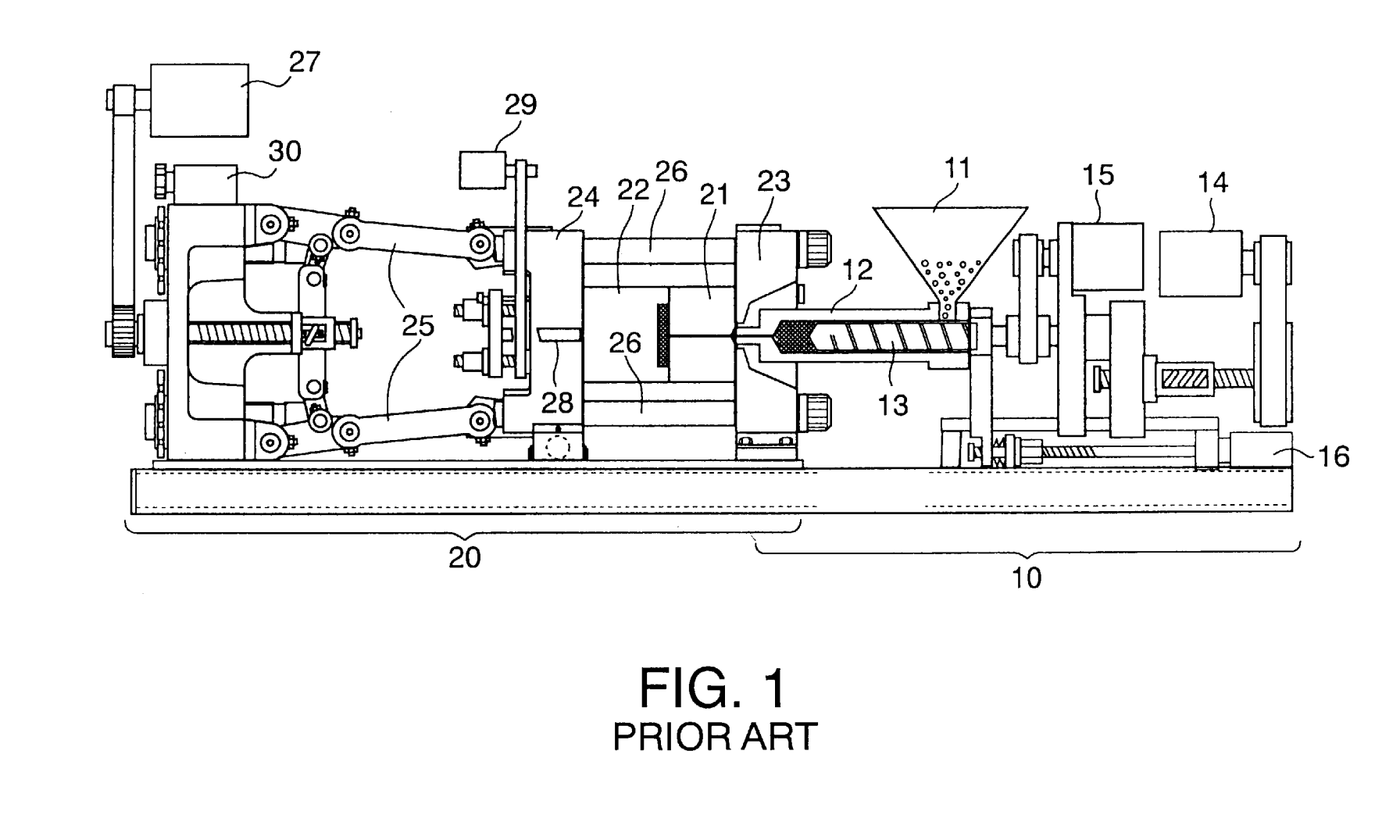
FIG. 1 is a descriptive view of a configuration of a typical motor-driven injection molding machine.

FIG. 1 illustrates the configuration of a typical motor-driven injection molding machine. This motor-driven injection molding machine has an injection unit 10 and a mold clamping mechanism 20. The injection unit 10 comprises a hopper 11 for temporarily storing a raw resin material, a heating cylinder 12 for plasticizing and melting a resin fed from the hopper 11, and a screw 13 for metering the molten resin in the heating cylinder 12 and injecting the thus metered molten resin. The molten resin is injected into a cavity positioned between a fixed mold 21 and a movable mold 22.

The mold clamping mechanism 20 comprises the fixed mold 21, the movable mold 22, a fixed platen 23 and a movable platen 24, to which the fixed mold 21 and the movable mold 22 are attached, respectively, a toggle link 25 for moving the movable platen 24, and a plurality of tie bars 26 for guiding the movable platen 24.

The motor-driven injection molding machine further comprises a plurality of drive motors (servo motors). The plurality of drive motors includes an injection motor 14 to move the screw forward and backward; a metering motor 15 for rotating the screw 13; an injection unit moving motor 16 to move the entire injection unit 10 forward and backward; a mold opening/closing motor 27 for moving the movable platen 24; an ejecting motor 29 to move an eject pin 28 incorporated in the movable platen 24 forward and backward; and a mold thickness complying motor 30 to move the movable platen 24 and the toggle link 25 in accordance with the thickness of the fixed mold 21 and the movable mold 22.

Figure 2:
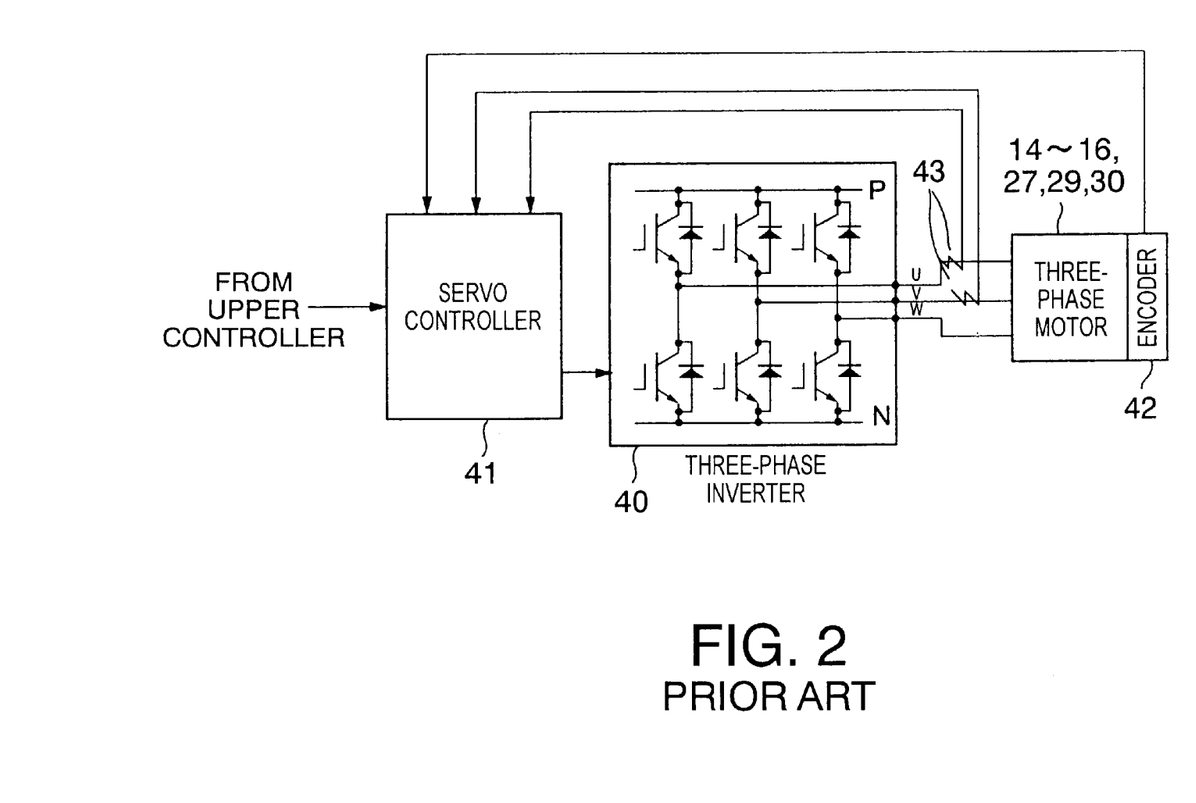
FIG. 2 is a block diagram illustrating a control unit of a typical three-phase motor.

The plurality of drive motors 14 to 16, 27, 29 and 30 are individually drive-controlled. For example, when all the drive motors are three-phase motors, as shown in FIG. 2, a servo controller 41 is connected via a three-phase inverter 40 to each of the drive motors 14 to 16, 27, 29 and 30. An encoder 42 for detecting rotation of the motors and two current sensors 43 for detecting the magnitude of drive current fed from the three-phase inverter 40 are attached to each of the drive motors 14 to 16, 27, 29 and 30. Detection signals from the encoder 42 and the current sensors 43 are fed back to the servo controller 41.

The servo controller 41 issues, under control of an upper control unit not shown, a control signal to the three-phase inverter 40 on the basis of the detection signals fed back from the encoder 42 and the current sensors 43. The three-phase inverter 40 generates signals (drive current) for three phases including U-phase, V-phase and W-phase in response to the control signal from the servo controller 41, and feeds the same to the three-phase motors. The three-phase motors thus rotate by an instructed amount of rotation at a timing instructed by the upper control unit.

In the motor-driven injection molding machine, as described above, the drive motors 14 to 16, 27, 29 and 30 are independently controlled by the corresponding servo controllers, and injection molding is thus carried out.

A hydraulic injection molding machine is characterized in that it is possible to achieve a larger transmission energy per unit time with a relatively small-sized apparatus. This is why there is a tendency toward adopting the hydraulic method for a large-scale (large-output) injection molding machine. There is, however, a demand for adopting the motor drive method or the hybrid method also for a large-capacity injection molding machine.

In order to adopt the motor drive method or the hybrid method for a large-capacity injection molding machine, it is necessary to provide a large-output motor. In order to control the large-output motor, it is necessary to increase the maximum dielectric strength or maximum current of the inverter. Along with this, the corresponding voltage must be increased, for example, from 200-V class to 400-V class, for the control system of the servo controllers or the like.

On the other hand, the maximum output torque of the motor required for the injection molding machine varies with the drive source. For example, there is a considerable difference between the maximum output torque that the mold opening/closing motor is required to have and the maximum output torque that the ejecting motor is required to have. Even within a molding cycle, the torque that a motor is required to have is not constant. A large torque is required in some cases, and only a small torque suffices in others. When adopting the motor drive method or the like for a large-capacity injection molding machine, therefore, it is necessary to provide motors, inverters and servo controllers in response to the maximum output torque and change in torque necessary for the individual driving sources. This presents a problem in that the individual motors cannot have a common control unit.

Japanese Unexamined Patent Application Publication No. 2000-41392 (hereinafter referred to as "Publication 1") discloses a brushless DC motor comprising an inverter connected to two three-phase windings. Japanese Unexamined Patent Application Publication No. 7-298685 (hereinafter referred to as "Publication 2") discloses an invention that can drive a six-phase induction motor by the use of two inverters. However, because the two inverters are connected to the same controller, it is necessary to change the configuration (software) of the controller in accordance with the purpose of use in the above-mentioned Publications 1 and 2. The inventions disclosed in Publications 1 and 2 suggest nothing about the following object of the present invention of a common control unit, and disclose or suggest nothing about means for achieving such an object.

Furthermore, in the conventional motor-driven type injection molding machine or hybrid molding machine, a single drive motor is connected to a single inverter, and a single servo controller is connected to this inverter. When the inverter fails and cannot be controlled by the servo controller, runaway of the drive motor may occur. If such a runaway occurs, for example, in the mold opening/closing motor 27, the movable mold 22 held by the movable platen 24 collides with the fixed mold 21 held by the fixed platen 23, thus leading to breakage of these molds.

In the control unit of the motor for the conventional injection molding machine, as described above, if an inverter fails and the motor is in a runaway state, a problem exists in that there are no means for stopping the motor. For example, the brushless DC motor disclosed in Publication 1 has an object to rotate the motor even when a problem occurs in an inverter circuit or the like. Publication 1 does not disclose or suggest anything about stopping a runaway motor.

SUMMARY OF THE INVENTION

Accordingly, it is an object of the present invention to make it possible to concurrently use various portions of a control unit for controlling drive motors used in an injection molding machine. In other words, the present invention has an object to achieve a control unit for controlling drive motors having a large maximum output by the use of circuits for a control unit for controlling drive motors having a small maximum output.

A control unit of a motor for an injection molding machine according to the present invention is for driving and controlling AC motors, each having a plurality of sets of three-phase windings, used for an injection molding machine.

The control unit according to a first aspect of the present invention has a plurality of three-phase inverters connected to the plurality of sets of three-phase windings, respectively, and a plurality of servo controllers connected to the plurality of three-phase inverters, respectively.

The control unit according to a second aspect of the present invention has a plurality of three-phase inverters connected to the plurality of sets of three-phase windings, respectively, and a plurality of servo controllers connected to the plurality of three-phase inverters, respectively. In addition, each of the plurality of three-phase inverters has a first self-diagnosing circuit. When abnormality is detected, the first self-diagnosing circuit issues a first abnormality signal to the servo controller connected to the three-phase inverter having the first self-diagnosing circuit having detected the abnormality. The servo controller having received the first abnormality signal transfers the first abnormality signal to the other servo controllers.

DESCRIPTION OF THE PREFERRED EMBODIMENTS

Figure 3:
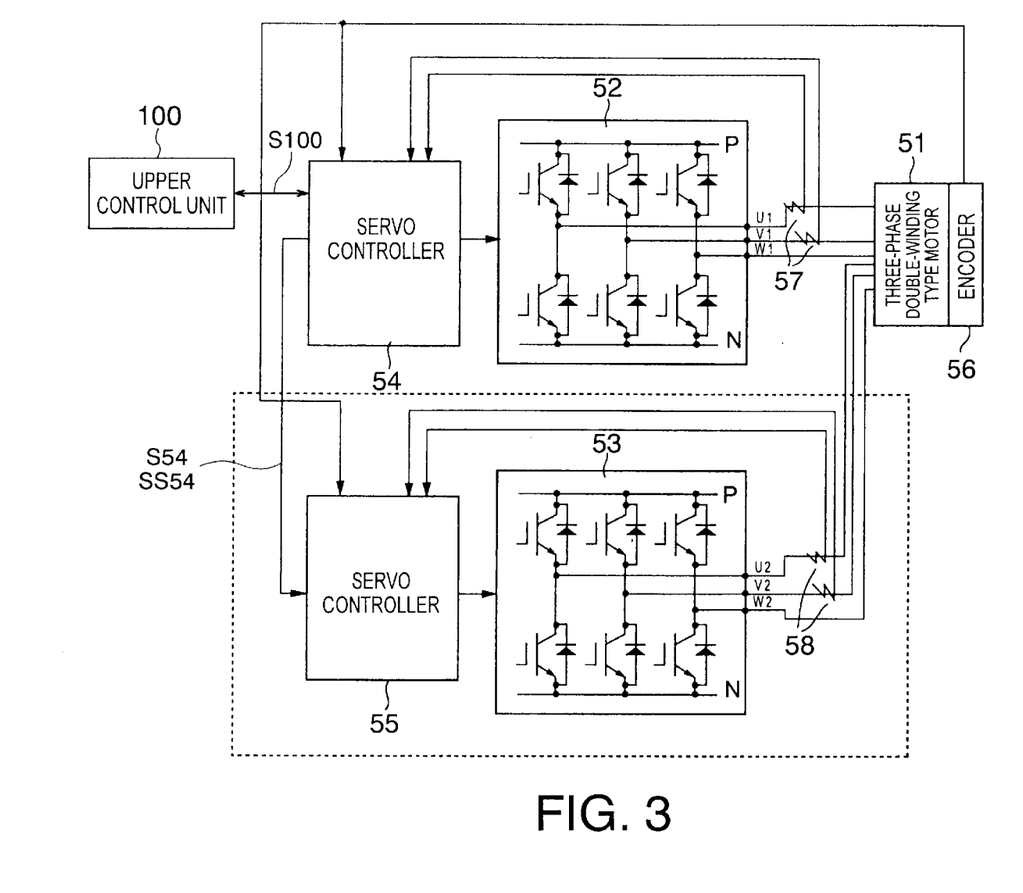
FIG. 3 is a block diagram illustrating a control unit of a motor for an injection molding machine according to a first embodiment of the invention.

A control unit of a motor for an injection molding machine according to a first embodiment of the present invention will be described with reference to FIG. 3. In FIG. 3, the control unit comprises a three-phase double-winding type motor 51 having two sets of three-phase windings; first and second three-phase inverters 52 and 53 feeding drive currents to the two sets of three-phase windings, respectively; and first and second servo controllers 54 and 55 connected to the first and second inverters 52 and 53, respectively. The control unit further comprises an encoder 56 attached to the three-phase double-winding type motor 51 and detects the rotation thereof; and first and second current sensors 57 and 58 detecting drive currents fed to the two sets of three-phase windings, respectively. The first current sensors 57 comprise two sensors for detecting U-phase drive current and V-phase drive current fed to one of the two sets of three-phase windings. The second current sensors 58 comprise two sensors for detecting U-phase drive current and V-phase drive current fed to the other of the two sets of three-phase windings.

Figure 4A:
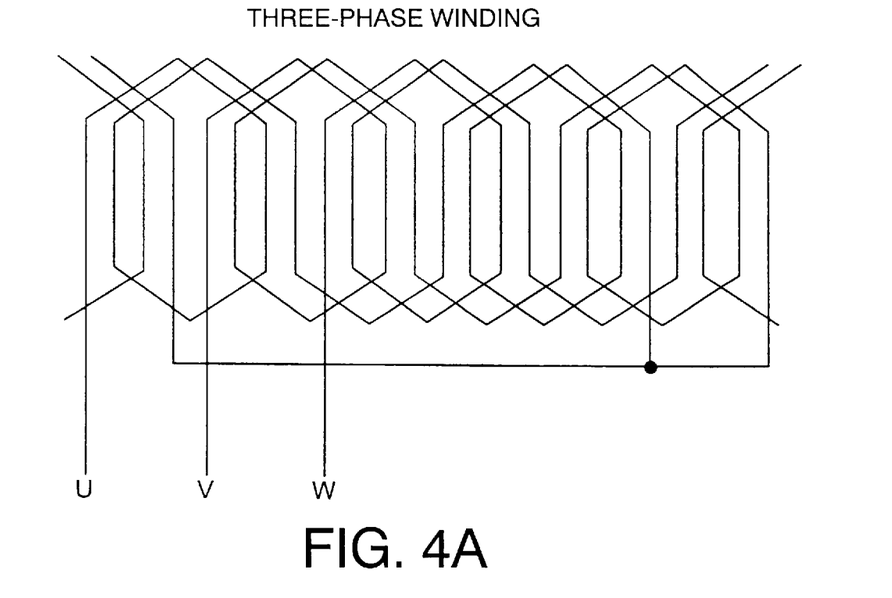
FIGS. 4A and 4B are a connection diagram of windings used in a general three-phase motor, and a connection diagram of windings used in a three-phase double-winding type motor.
Figure 4B:
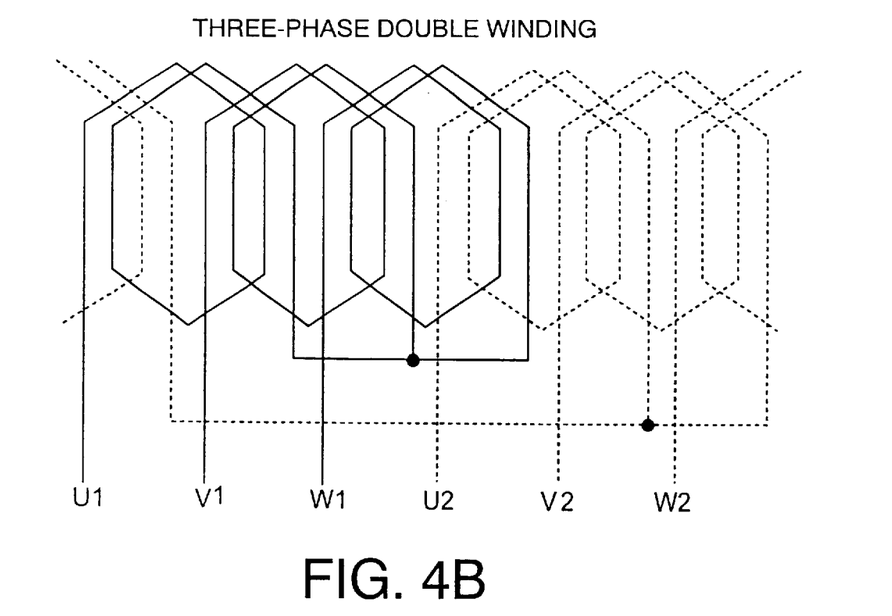

The three-phase double-winding type motor 51 has two sets of U-phase, V-phase and W-phase windings (U1, V1, W1 and U2, V2, and W2), each providing a phase angle shift of 120. When an ordinary three-phase winding is expressed as shown in FIG. 4A, these windings are as shown in FIG. 4B.

The first and second three-phase inverters 52 and 53 have the same configuration, and as shown in FIG. 3, are composed of a plurality of power transistors and a plurality of diodes. Each of these first and second three-phase inverters 52 and 53 has capacities to supply at least a half the drive current necessary for obtaining the maximum output required by the three-phase double-winding type motor 51.

The first and second servo controllers 54 and 55 have the same configurations, i.e., are operable on the same software, and have control performance to cope with a motor having a maximum output of half the maximum output required by the motor 51. For the first and second servo controllers 54 and 55, switching is possible between master and slave. In this case, the first servo controller 54 is set as the master, and the second servo controller 55, as the slave. The first servo controller 54, set as the master, is connected to an upper control unit 100. The second servo controller 55, set as the slave, is connected to the first servo controller 54, set as the master.

The encoder 56 detects rotation of the three-phase double-winding type motor 51, generates a prescribed number of pulses per turn, and outputs the same to the first and second servo controllers 54 and 55. The first and second servo controllers 54 and 55 can calculate the rotation speed of the three-phase double-winding type motor 51 from the number of pulses entered per unit time and the amount of rotation of the three-phase double-winding type motor 51 from the total number of pulses.

The first and second current sensors 57 and 58 detect drive currents flowing through the windings U1 and V1, and drive currents flowing through the windings U2 and V2, respectively, and output the detection values to the first and second servo controllers 54 and 55. The first and second servo controllers 54 and 55 control the first and second three-phase inverters 52 and 53 on the basis of these detection values, and the rotation speed and the amount of rotation of the three-phase double-winding type motor 51.

The operation of this control unit will now be described.

First, the first servo controller 54 receives an operating instruction signal S100 from the upper control unit 100. When the operating instruction signal S100 instructs generation of a large torque, the first servo controller 54 issues a necessary control instruction signal S54 to the second servo controller 55. The first servo controller 54 subsequently supplies a synchronization signal SS54 to the second servo controller 55.

Then, the first servo controller 54 issues a control signal to the first three-phase inverter 52 in compliance with the operating instruction signal S100 from the upper control unit 100. Similarly, the second servo controller 55 issues a control signal to the second three-phase inverter 53, at a timing in synchronization with the synchronization signal SS54, in accordance with the control instruction signal S54 from the first servo controller 54.

The first and second three-phase inverters 52 and 53 generate drive currents in response to the control signals from the first and second servo controllers 54 and 55, respectively, and supply the same to the three-phase double-winding type motor 51, whereby the three-phase double-winding type motor 51 rotates.

The encoder 56 detects rotation of the three-phase double-winding type motor 51, and outputs detection pulses to the first and second servo controller 54 and 55. The first and second current sensors 57 and 58 detect drive currents flowing to the windings U1 and V1 and the windings U2 and V2, respectively, and output the detected values to the first and second servo controllers 54 and 55.

The first servo controller 54 causes a change in the control signal to the first three-phase inverter 52 on the basis of the detected value from the first current sensor 57 and the detection pulses from the encoder 56. Similarly, the second servo controller 55 causes a change in the control signal to the second three-phase inverter 53, on the basis of the detected value from the second current sensor 58 and the detection pulses from the encoder 56. As a result, a change occurs in drive current fed from the first and second three-phase inverters 52 and 53 to the three-phase double-winding type motor 51, thereby controlling the rotation torque and speed of the three-phase double-winding type motor 51.

In this control unit, as described above, a large torque can be generated in the three-phase double-winding type motor 51 without the need to use special inverters or controllers for a large-output motor.

When the operating instruction signal S100, received by the first servo controller 54 from the upper control unit 100, is an instruction to produce a small torque, the first servo controller 54 does not output a control instruction signal to the second servo controller 55. The first servo controller 54 solely controls rotation of the three-phase double-winding type motor 51. More specifically, the first servo controller 54 issues a control signal to the first three-phase inverter 52, in accordance with the operating instruction signal S100 from the upper control unit 100, and the first three-phase inverter 52 supplies drive current to the three-phase double-winding type motor 51 in accordance with this control signal. The first servo controller 54 causes a change in the control signal to the first three-phase inverter 52 on the basis of the detected value from the first current sensor 57 and the detection pulses from the encoder 56.

With this control unit, as described above, it is possible to generate a small torque using the three-phase double-winding type motor 51, by operating only one of the servo controllers, while keeping the other stopped.

According to the control unit of this embodiment, as described above, the motor is controlled by the use of two inverters and two servo controllers when a large torque is required, and the motor can be controlled by the use of a single inverter and a single servo controller when a large torque is not necessary. More specifically, according to the control unit of this embodiment, motors of various capacities can be used ranging from a small maximum output torque to a large maximum output torque, i.e., irrespective of the extent of maximum output torque. From a different point of view, because the control unit of this embodiment is composed of a plurality of controllers and inverters having the same configurations, it is possible to easily change the configuration in accordance with the capacity of the motor to be controlled by changing the number thereof. In this case, different kinds of controllers or inverters are not required and it is possible to achieve cost reduction.

A control unit according to a second embodiment of the present invention will now be described with reference to FIG. 5. Only differences from the first embodiment will be described.

Figure 5:
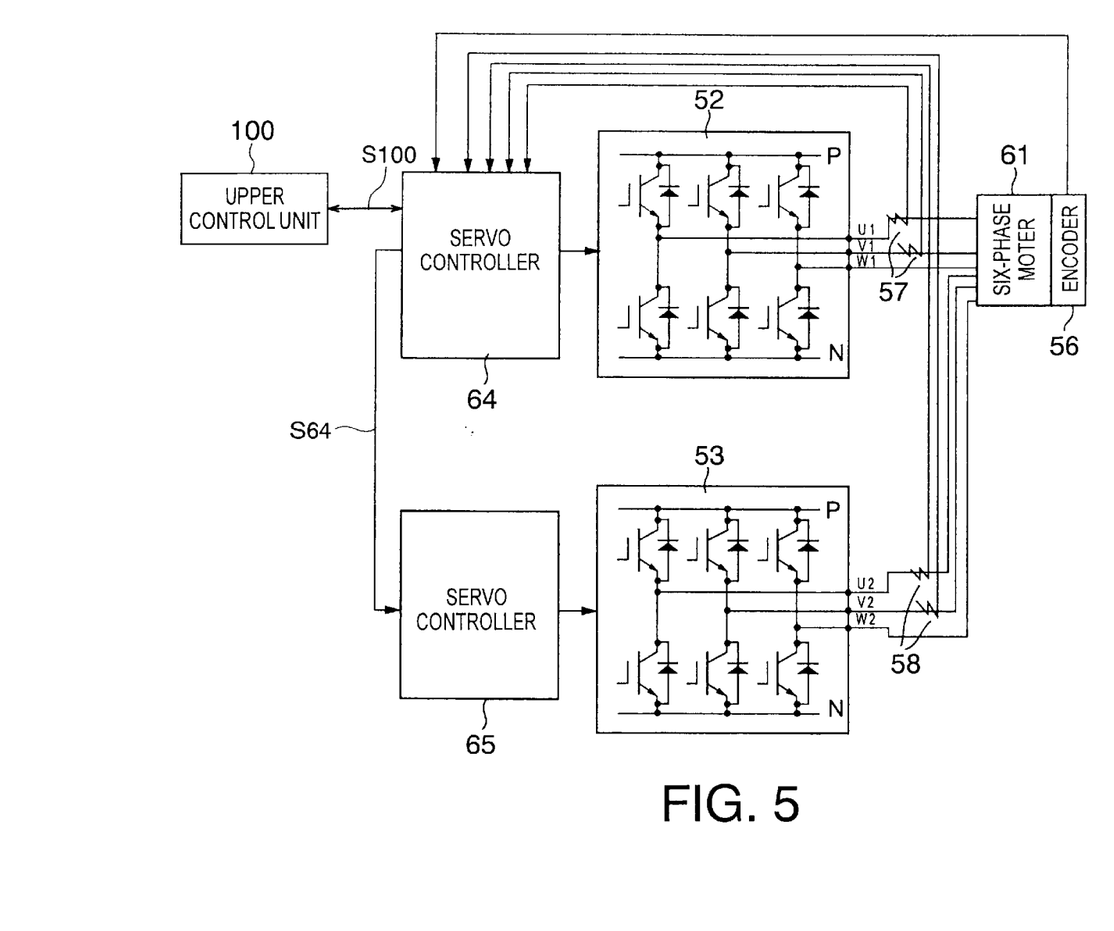
FIG. 5 is a block diagram illustrating the control unit of a motor for an injection molding machine according to a second embodiment of the invention.
Figure 6:
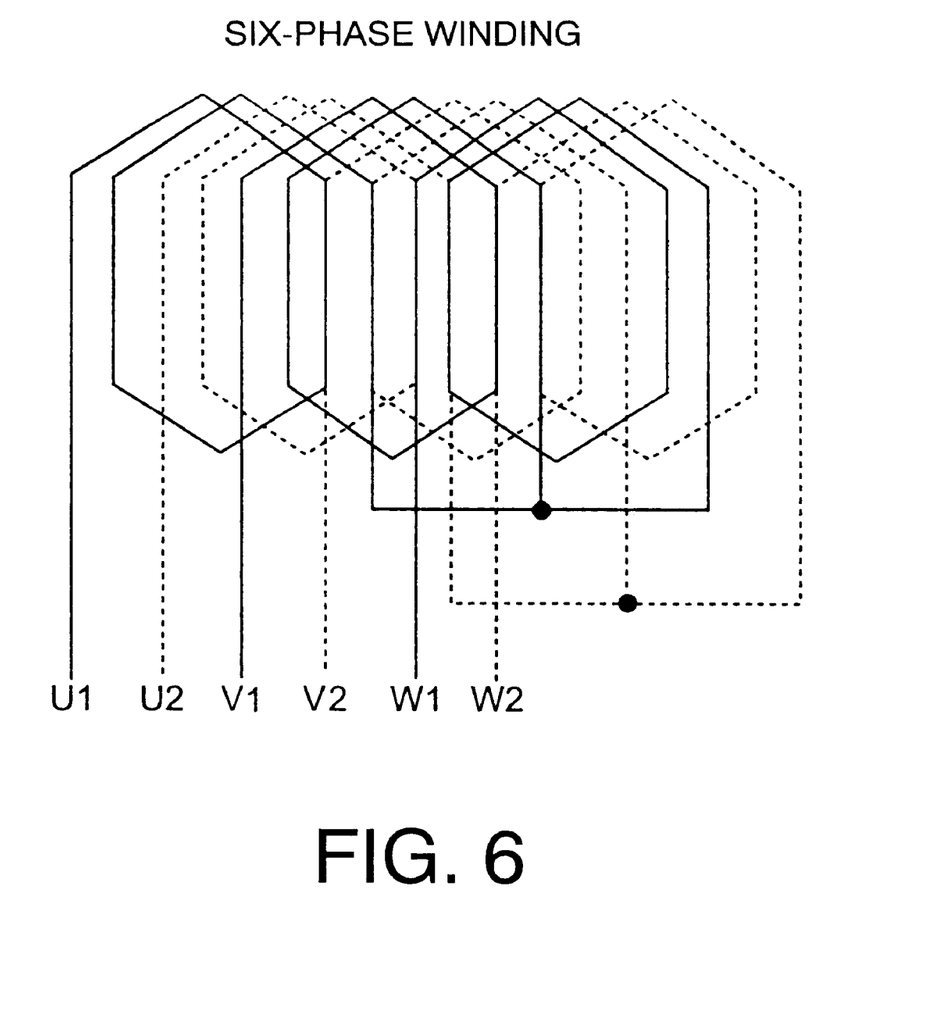
FIG. 6 is a connection diagram of windings used for a six-phase motor.

The control unit shown in FIG. 5 has a six-phase motor 61 in place of the three-phase double-winding type motor. The winding of the six-phase motor 61 is as shown in FIG. 6. The encoder 56 is connected only to a first servo controller 64, not to a second servo controller 65. Both the first and second current sensors 57 and 58 are connected to the first servo controller 64.

The first and second servo controllers 64 and 65 have the same configurations, and can be switched between master and slave, as in the first embodiment. In this embodiment, the first servo controller 64 is set as the master, and the second servo controller 65 is set as the slave. The first servo controller 64 is connected to the upper control unit 100. The first servo controller 64 generates, under control of the upper control unit 100, a control signal to be output to the first three-phase inverter 52, and a control instructing signal S64 to be output to the second servo controller 65, on the basis of the detection values from the first and second current sensors 57 and 58 and the detection pulses from the encoder 56. The second servo controller 65 controls the second three-phase inverter 53 only on basis of a control instructing signal S64 from the first servo controller 64.

In this embodiment as well, when a large torque is required, drive current is supplied from both the first and second three-phase inverters 52 and 53 to the six-phase motor 61. When the required torque is small, on the other hand, drive current is supplied to the six-phase motor 61 only from the first three-phase inverter 52. Thus, in the control unit of this embodiment as well, it is possible to control motors of various capacities ranging from a small maximum output torque to a large maximum output torque, i.e., irrespective of the maximum output torque.

A six-phase motor may be used in the first embodiment, and a three-phase double-winding type motor may be used in the second embodiment. In both cases, the number of sets of three-phase windings of the motor are not limited to two, and a motor having more sets of three-phase windings may be adopted.

According to the first and second embodiments, AC motors, each having a plurality of sets of three-phase windings are controlled by the use of combinations of a plurality of three-phase inverters and a plurality of servo controllers. As a result, it is possible to control the AC motors and generate various torques, ranging from large to small, without the need to use special circuits for a large-capacity motor.

Figure 7:
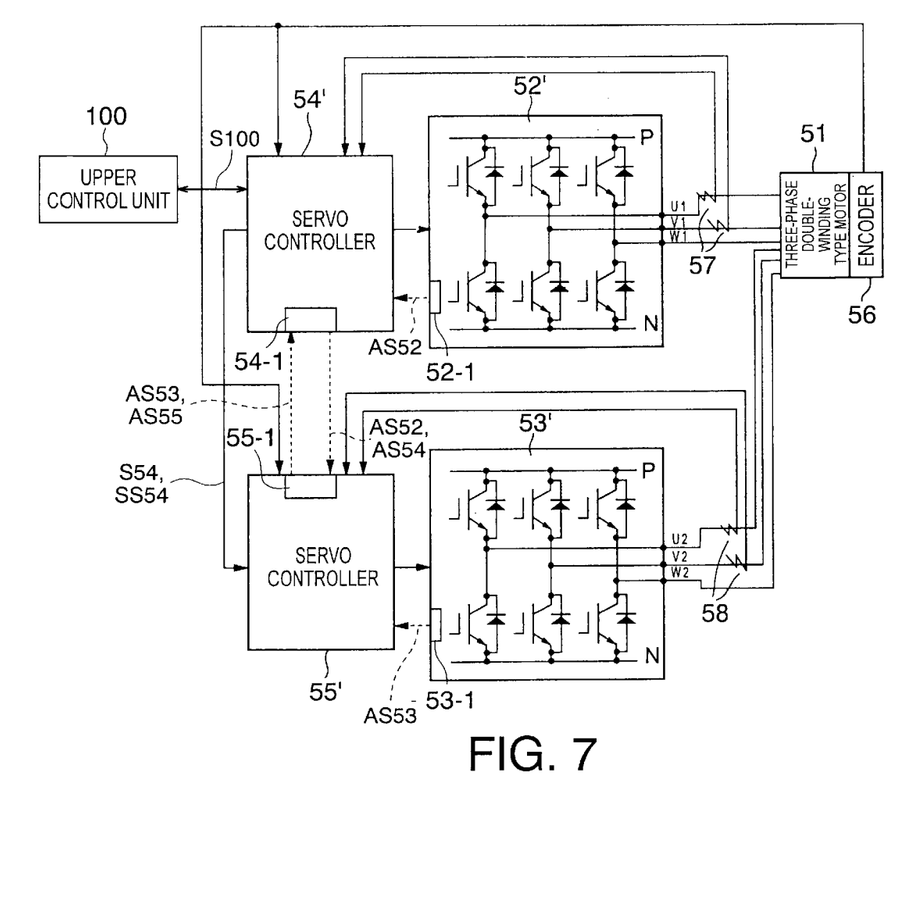
FIG. 7 is a block diagram illustrating a control unit of a motor for an injection molding machine according to a third embodiment of the invention.

A control unit of a motor for the injection molding machine, according to a third embodiment of the present invention, will now be described with reference to FIG. 7. In FIG. 7, the control unit comprises a three-phase double-winding type motor 51 having two sets of three-phase windings; first and second three-phase inverters 52' and 53' supplying drive currents to the two sets of three-phase windings, respectively; and first and second servo controllers 54' and 55' connected to the first and second inverters 52' and 53', respectively. The control unit further comprises the encoder 56 attached to the three-phase double-winding type motor 51 to detect rotation thereof; and the first and second current sensors 57 and 58 detecting drive currents fed to the two sets of three-phase windings, respectively. The first current sensors 57 comprises two sensors for detecting U-phase drive current and V-phase drive current fed to one of the two sets of three-phase windings. The second current sensors 58 comprises two sensors for detecting U-phase drive current and V-phase drive current fed to the other of the two sets of three-phase windings.

The three-phase double-winding type motor 51 has two sets of U-phase, V-phase and W-phase windings (U1, V1 and w1, and U2, V2 and W2) each providing a phase angle shift of 120, and is formed by winding these windings one on top of the other. When an ordinary three-phase winding is expressed as shown in FIG. 4A, these windings are as shown in FIG. 4B, as described above.

The first and second three-phase inverters 52' and 53' have the same configurations, and as shown in FIG. 7, are composed of a plurality of power transistors and a plurality of diodes. The first and second three-phase inverters 52' and 53' have self-diagnosing circuits (first self-diagnosing sections) 52-1 and 53-1 for self-checking, respectively. These first and second three-phase inverters 52' and 53' have capacities to supply at least half the driving current necessary for obtaining a maximum output that the three-phase double-winding type motor 51 is required to have.

The first and second servo controllers 54' and 55' have the same configurations, i.e., are operable on the same software, and have a control ability to cope with the three-phase double-winding type motor 51 having a maximum output corresponding to half the maximum output that the three-phase double-winding type motor 51 is required to have. The first and second servo controllers 54' and 55' have self-diagnosing circuits (second self-diagnosing sections) 54-1 and 55-1, respectively. These first and second servo controllers 54' and 55' permit switching between the master and the slave. In this embodiment, the first servo controller 54' is set as the master, and the second servo controller 55', as the slave. The first servo controller 54', set as the master, is connected to an upper control unit 100. The second servo controller 55', set as the slave, is connected to the first servo controller 54', set as the master.

The encoder 56 detects rotation of the three-phase double-winding type motor 51, generates a prescribed number of pulses for each turn, and outputs the same to the first and second servo controllers 54' and 55'. The first and second servo controllers 54' and 55' can calculate the rotation speed of the three-phase double-winding type motor 51 from the number of pulses entered per unit time, and the amount of rotation of the three-phase double-winding type motor 51 from the total number of pulses.

The first and second current sensors 57 and 58 detect drive currents flowing through the windings U1 and V1 and drive currents flowing through the windings U2 and V2, respectively, and output the detection values to the first and second servo controllers 54' and 55'. The first and second servo controllers 54' and 55' control the first and second three-phase inverters 52' and 53' on the basis of these detection values and the rotation speed and the amount of rotation of the three-phase double-winding type motor 51.

Operation of the control unit of the present invention will now be described.

The first servo controller 54' receives an operating instruction signal S100 from the upper control unit 100. When the operating instruction signal S100 instructs generation of a large torque, the first servo controller 54' outputs a necessary control instruction signal S54 to the second servo controller 55'. Subsequently, the first servo controller 54' issues a synchronization signal SS54 through the same route to the second servo controller 55'.

Then, the first servo controller 54' issues a control signal to the first three-phase inverter 52' in accordance with the operating instruction signal from the upper control unit 100. Similarly, the second servo controller 55' issues a control signal to the second three-phase inverter 53' at a timing of synchronizing with the synchronization signal SS54, in accordance with the control instruction signal S54 from the first servo controller 54'.

The first and second three-phase inverters 52' and 53' generate drive currents in response to the control signals from the first and second servo controllers 54' and 55', respectively, and supply the same to the three-phase double-winding type motor 51 whereby the three-phase double-winding type motor 51 rotates.

The encoder 56 detects rotation of the three-phase double-winding type motor 51, and outputs the detection pulses to the first and second servo controllers 54' and 55'. The first and second current sensors 57 and 58 detect drive currents flowing through the windings U1 and V1 and drive currents flowing through the windings U2 and V2, and output the detected values to the first and second servo controllers 54' and 55'.

The first servo controller 54' causes a change in the control signal to the first three-phase inverter 52' on the basis of the detection value from the first current sensor 57 and the detected pulses from the encoder 56. Similarly, the second servo controller 55' causes a change in the control signal to the second three-phase inverter 53' on the basis of the detection value from the second current sensor 58 and the detected pulses from the encoder 56. As a result, there occurs a change in drive current fed from the first and second three-phase inverters 52' and 53' to the three-phase double-winding type motor 51, thus controlling the rotation torque and speed of the three-phase double-winding type motor 51.

In this control unit, as described above, it is possible to generate a large torque in the three-phase double-winding type motor 51 without the need for a special inverter, a large-output motor or a special controller.

When the operating instruction signal S100 from the upper control unit 100 instructs the generation of a small torque, the first servo controller 54' does not output a control instruction signal S54 to the second servo controller 55'. In this case, the first servo controller 54' solely controls the three-phase double-winding type motor 51. More specifically, the first servo controller 54' issues a control signal to the first three-phase inverter 52' in accordance with the operating instruction signal S100 from the upper control unit. The first three-phase inverter 52' supplies driving current to the three-phase double-winding type motor 51 in accordance with this control signal. The first servo controller 54' causes a change in the control signal to the first three-phase inverter 52' on the basis of the detection value from the first current sensor 57 and the detected pulses from the encoder 56.

The control unit conducts control, as described above, in accordance with the torque to be produced in the three-phase double-winding type motor 51. When any of the self-diagnosing circuits 52-1 and 53-1 of the first and second three-phase inverters 52' and 53', and the self-diagnosing circuits 54-1 and 55-1 of the first and second servo controllers 54' and 55' detect an abnormality, the control unit operates as follows.

When the self-diagnosing circuit 52-1 (or 53-1) of the three-phase inverter 52' (or 53') detects abnormality and the detected abnormality is due to inability to control the drive current fed to the three-phase double-winding type motor 51, an abnormality signal AS52 (or AS53) is issued from the self-diagnosing circuit 52-1 (or 53-1), having detected the abnormality to the servo controller 54' (or 55'). Upon receipt of the abnormality signal AS52 (or AS53) issued from the three-phase inverter 52' (or 53'), the servo controller 54' (or 55') outputs the received abnormality signal AS52 (or AS53) to the servo controller 55' (or 54'). Upon receipt of the abnormality signal AS52 (or AS53) from the servo controller 54' (or 55'), the servo controller 55' (or 54') outputs a control signal to the three-phase inverter 53' (or 52') so as to stop rotation of the three-phase double-winding type motor 51. The three-phase inverter 53' (or 52') causes a change in drive current supplied so as to stop rotation of the three-phase double-winding type motor 51 on the basis of the control signal from the servo controller 55' (or 54').

On the other hand, when the self-diagnosing circuit 54-1 (or 55-1) of the servo controller 54' (or 55') detects abnormality, the detected abnormality may cause the three-phase double-winding type motor 51 to continue rotating, then, an abnormality signal AS54 (or AS55) is issued to the servo controller 55' (or 54'). Upon receipt of the abnormality signal AS54 (or AS55), the servo controller 55' (or 54') issues, as described above, a control signal to stop the three-phase double-winding type motor 51 to the three-phase inverter 53' (or 52'). The three-phase inverter 53' (or 52') stops rotation of the three-phase double-winding type motor 51 on the basis of the control signal from the servo controller 55' (or 54').

According to the control unit of the present invention, as described above, when abnormality occurs in the three-phase inverter or the servo controller, the occurrence of the abnormality is notified to the normally operating servo controller connected to the normally operating three-phase inverter, thus permitting prompt stoppage of the motor.

In a motor-driven injection molding machine, a plurality of drive motors perform molding operations (metering process, injection process, dwelling process, and cooling process) concurrently. Therefore, when abnormality occurs in any of the drive motors and the control circuits thereof (inverter and servo controllers), it is necessary to stop operation of the other drive motors as well. Therefore, when receiving an abnormality signal AS52 from the first three-phase inverter 52', or when the self-diagnosing circuit 54-1 detects abnormality, or when an abnormality signal AS53 or AS55 is received from the second servo controller 55', the first servo controller 54' set as the master outputs (transfers) the abnormality signal to the upper control unit 100. Upon receipt of the abnormality signal, the upper control unit 100 issues a control instruction signal to the servo controller (not shown) controlling the other drive motors, so as to immediately stop the molding operations or to stop the molding operations promptly after the completion of the process currently underway. When abnormality occurs in any of the drive motors, the motor-driven injection molding machine can promptly discontinue molding operations.

The control unit of a motor for an injection molding machine according to a fourth embodiment of the invention will now be described with reference to FIG. 8. Only differences from the third embodiment will be described.

Figure 8:
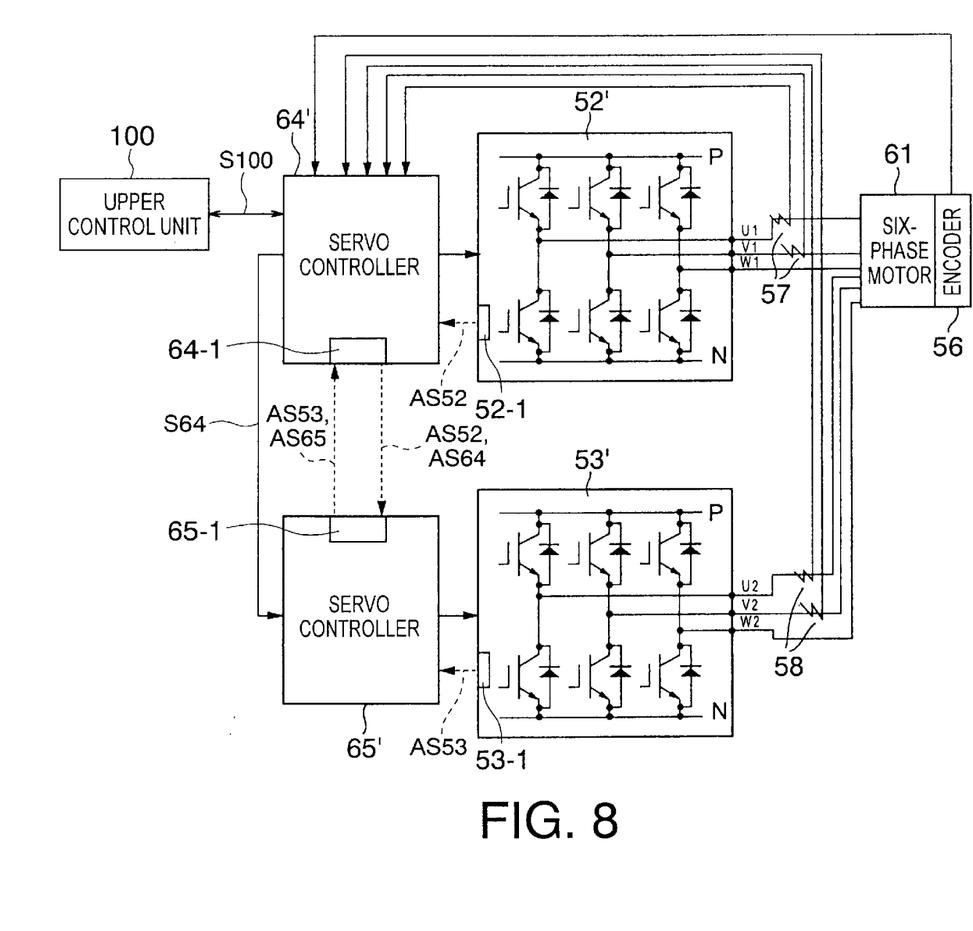
FIG. 8 is a block diagram illustrating a control unit of a motor for an injection molding machine according to a fourth embodiment of the invention.

In FIG. 8, the control unit has the six-phase motor 61 as in the second embodiment in place of the three-phase double-winding type motor. The winding of the six-phase motor is as described above and as shown in FIG. 6. The encoder 56 is connected only to the first servo controller 64', not to the second servo controller 65'. Furthermore, both the first and second current sensors 57 and 58 are connected only to the first servo controller 64'.

The first and second servo controllers 64' and 65' have the same configuration as in the third embodiment, and can be switched between a master and a slave. In this embodiment, the first servo controller 64' is set as the master, and the second servo controller 65' is set as the slave. The first servo controller 64' is connected to an upper control unit 100. Under control of the upper control unit 100, the first servo controller 64' generates a control signal to be output to the first three-phase inverter 52' and a control instruction signal to be output to the second servo controller 65', on the basis of the detection value from the first and second current sensors 57 and 58 and the detected pulses from the encoder 56. The second servo controller 65' controls the second three-phase inverter 53' on the basis of only a control instruction signal S64 from the first servo controller 64'.

In this embodiment as well, when abnormality occurs in the first three-phase inverter 52', an abnormality signal AS52 is transmitted from the first servo controller 64' to the second servo controller 65'. When abnormality occurs in the second three-phase inverter 53', on the other hand, an abnormality signal AS53 is transmitted to the first servo controller 64'. As a result, when abnormality occurs in any of the first and second three-phase inverters 52' and 53', it is possible to promptly stop rotation of the six-phase motor 61. Thus, this embodiment of the invention provides a control unit which can promptly stop rotation of drive motors even when an inverter fails and the drive motors are in runaway.

When abnormality occurs in the second servo controller 65', an abnormality signal AS65 is issued from a self-diagnosing circuit 65-1 to the first servo controller 64', thus permitting stoppage of rotation of the six-phase motor 61. When abnormality occurs in the first servo controller 64', an abnormality signal AS64 is issued from a self-diagnosing circuit 64-1. In this case, if information necessary for control in the second servo controller 65' has been supplied as a control instruction signal S64 from the first servo controller 64', rotation of the six-phase motor 61 can be discontinued in the same manner as above.

In all events, the occurrence of the abnormality is outputted from the first servo controller 64, set as the master, to the upper control unit 100. The upper control unit 100 outputs a control signal to the servo controller (not shown) controlling the other normally operating drive motors, and immediately stops the molding operation, or promptly stops the molding operation upon completion of the process currently underway.

A six-phase motor may be used in the third embodiment, and a three-phase double-winding type motor may be used in the fourth embodiment. In any of these case, not only motors each having two sets of three-phase windings, but also motors having a plurality of sets of three-phase windings may be used.

In the aforementioned third and fourth embodiments, motors, each having a plurality of sets of three-phase windings, are controlled by the use of a combination of a plurality of three-phase inverters and a plurality of servo controllers. As a result, when abnormality occurs in any of the three-phase inverters and the servo controller, rotation can be discontinued without causing runaway of the motor by issuing the abnormality signal to the normally operating servo controller.

Each of the first and second three-phase inverters in the first and second embodiments may have a self-diagnosing circuit for self-checking as in the third embodiment. Similarly, each of the first and second servo controllers in the first and second embodiments may have a self-diagnosing circuit as in the third embodiment.

What is claimed is:

1. An injection molding machine having a control unit, wherein the control unit controls an AC motor having a plurality of sets of three-phase windings, the control unit comprising:
    a plurality of three-phase inverters connected to said plurality of sets of three-phase windings, respectively,
    a plurality of servo controllers connected to said plurality of three-phase inverters, respectively, and
    said plurality of servo controllers being connected through a signal line so that a drive current phase fed from said plurality of three-phase inverter to said plurality of sets of three-phase windings coincides with a corresponding current phase.

2. An injection molding machine having a control unit according to claim 1, the control unit further comprising:
    an encoder for detecting rotation of said AC motor; and
    a plurality of sets of current sensors which individually detect drive current fed to said plurality of sets of three-phase windings, respectively;
    wherein each of said plurality of servo controllers controls a corresponding one of said three-phase inverters on a basis of an output from a corresponding one of said current sensor sets and an output from said encoder.

3. An injection molding machine having a control unit according to claim 1, the control unit further comprising:
    an encoder which detects rotation of said AC motor; and
    a plurality of sets of current sensors each detecting drive currents individually fed to the plurality of sets of three-phase windings;
    wherein one of said plurality of servo controllers is connected as a master controller to said encoder and said plurality of current sensors;
    the other servo controller being connected as slave controllers to said master controller;
    said master controlling a corresponding one of said three-phase inverters on a basis of an output from the set of said current sensors corresponding to said master controller and an output from said encoder, and generating a slave control signal for controlling ones of said three-phase inverters on a basis of an output from the sets of said current sensors corresponding to the individual slave controllers and an output from said encoder; and
    said individual slave controllers controlling said three-phase inverters corresponding to said slave controllers on a basis of said slave control signal from said master controller.

4. An injection molding machine having a control unit according to claim 1, wherein said AC motor is a three-phase double-winding AC motor.

5. An injection molding machine having a control unit according to claim 1, the control unit further comprising:
    an upper controller connected to at least one of said plurality of servo controllers;
    wherein, when an operating instruction from said upper controller is an instruction for producing a large torque, said AC motor is controlled by said plurality of three-phase inverters and said plurality of servo controllers; and
    when the operating instruction from said upper controller is an instruction for producing a small torque, said AC motor is controlled by any one of said plurality of three-phase inverters, and a servo controller connected thereto.

6. An injection molding machine having a control unit, wherein the control unit controls an AC motor having a plurality of sets of three-phase windings, comprising:
    a plurality of three-phase inverters individually connected to said plurality of sets of three-phase winding, and a plurality of servo controllers individually connected to said plurality of three-phase inverters;
    wherein each of said plurality of three-phase inverters has first self-diagnosing means;
    said first self-diagnosing means, when detection abnormality, issues a first abnormality signal to said servo controller connected to said three-phase inverter having the first self-diagnosing means having detected said abnormality; and
    upon receipt of said first abnormality signal, said servo controller transfers said first abnormality signal to the servo controllers.

7. An injection molding machine having a control unit according to claim 6, wherein:
    each of said plurality of servo controller has second self-diagnosing means; and
    said second self-diagnosing means issues, when detecting abnormality, a second abnormality signal to the other servo controllers.

8. An injection molding machine having a control unit according to claim 7, wherein,
    upon receipt of said first abnormality signal transferred or said second abnormality signal, said other servo controllers controls said three-phase inverters connected to said other servo controllers so as to stop said AC motor.

9. An injection molding machine having a control unit according to claim 6, the control unit further comprising:
    an encoder for detecting rotation of said AC motor; and
    a plurality of seats of current sensors detecting driving currents individually fed to said plurality of sets of three-phase windings;
    wherein each of said plurality of servo controllers controls one of said three-phase inverters corresponding thereto on the basis of an output from a corresponding one of said sets of current sensors and an output from said encoder.

10. An injection molding machine having a control unit according to claim 6, the control unit further comprising:
    an encoder for detecting rotation of said AC motor; and
    a plurality of sets of current sensors individually detecting driving currents fed to said plurality of sets of three-phase windings;

wherein one of said plurality of servo controllers is connected as a master controllers to said encoder and to said plurality of sets of current sensors;

other servo controllers being connected as slave controllers to said master controller;

said master controller controlling one of said three-phase inverters corresponding to said master controller on a basis of an output for one of said sets of current sensors corresponding to said master controller and an output from said encoder, and generating a slave control signal for controlling said three-phase inverters corresponding to individual slave controllers on a basis of an output from said sets of current sensors corresponding to the individual slave controllers and an output from said encoder; and the individual slave controllers controlling said three-phase inverters corresponding to said slave controllers on a basis of said slave control signal from said master controller.

11. An injection molding machine having a control unit according to claim 6 wherein said AC motor is a three-phase double-winding AC motor.

12. An injection molding machine having a control unit according to claim 7, the control unit further comprising:

an upper control unit connected to at least one of said plurality of servo controllers;

wherein, upon receipt of said first abnormality signal or said second abnormality signal from at least one of said servo controllers, said upper control unit causes the motor to immediately stop, or stop promptly upon completion of a process in progress.

13. An injection molding machine having a control unit, wherein the control unit controls an AC motor having a six-phase winding, comprising of:

a plurality of three-phase inverters connected to said six-phase winding, respectively, and a plurality of servo controllers connected to said plurality of three-phase inverters, respectively, and said plurality of servo controllers being connected through a signal line so that a drive current phase fed from said plurality of three-phase inverter to said six-phase winding coincides with a corresponding current phase.

14. An injection molding machine having a control unit according to claim 13, the control unit further comprising:

an encoder for detecting rotation of said AC motor; and a plurality of sets of current sensors which individually detect drive current fed to a plurality of sets of three-phase windings configured to form said six-phase winding, respectively;

wherein each of said plurality of servo controllers controls a corresponding one of said three-phase inverters on a basis of an output from a corresponding one of said current sensor sets and an output from said encoder.

15. An injection molding machine having a control unit according to claim 13, the control unit further comprising:

an encoder which detects rotation of said AC motor; and a plurality of sets of current sensors each detecting drive currents individually fed to a plurality of sets of three-phase windings configured to form said six-phase winding;

wherein one of said plurality of servo controllers is connected as a master controller to said encoder and said plurality of current sensors;

a remainder of said plurality of servo controllers being connected as slave controllers to said master controller;

said master controller controlling a corresponding one of said three-phase inverters on a basis of an output from the set of said current sensors corresponding to said master controller and an output from said encoder, and generating a slave control signal for controlling one of said three-phase inverters on a basis of an output from the sets of said current sensors corresponding to the individual slave controllers and an output from said encoder; and said individual slave controllers controlling said three-phase inverters corresponding to said slave controllers on a basis of said slave control signal from said master controller.

16. An injection molding machine having a control unit according to claim 13, the control unit further comprising:

an upper controller connected to at least one of said plurality of servo controllers;

wherein, when an operating instruction from said upper controller is an instruction for producing a first torque, said AC motor is controlled by said plurality of three-phase inverters and said plurality of servo controllers; and when the operating instruction from said upper controller is an instruction for producing a second torque, said AC motor is controlled by any one of said plurality of three-phase inverters, and a servo controller connected thereto wherein said second torque is less than said first torque.

17. An injection molding machine having a control unit, wherein the control unit controls an AC motor having a six-phase winding, comprising:

a plurality of three-phase inverters individually connected to a plurality of sets of three-phase windings configured to form said six-phase winding, and a plurality of servo controllers individually connected to said plurality of three-phase inverters;

wherein each of said plurality of three-phase inverters has first self-diagnosing means;

said first self-diagnosing means, when detecting abnormality, issues a first abnormality signal to said servo controllers connected to said three-phase inverters having the first self-diagnosing means having detected said abnormality; and upon receipt of said first abnormality signal, one of said servo controllers transfers said first abnormality signal to another of said servo controllers.

18. An injection molding machine having a control unit according to claim 17, wherein:

each of said plurality of servo controllers has second self-diagnosing means; and said second self-diagnosing means of said one of said servo controllers issues, when detecting abnormality, a second abnormality signal to said another of said servo controllers.

19. An injection molding machine having a control unit according to claim 17, the control unit further comprising:

an encoder for detecting rotation of said AC motor; and a plurality of seats of current sensors detecting driving currents individually fed to a plurality of sets of three-phase windings configured to form said six-phase winding;

wherein each of said plurality of servo controllers controls one of said three-phase inverters corresponding thereto on the basis of an output from a corresponding one of said sets of current sensors and an output from said encoder.

* * * * *

UNITED STATES PATENT AND TRADEMARK OFFICE
CERTIFICATE OF CORRECTION

PATENT NO.    : 6,676,400 B2
DATED         : January 13, 2004
INVENTOR(S)   : Akira Ito It is certified that error appears in the above-identified patent and that said Letters Patent is hereby corrected as shown below:

Title page,
Item [73], Assignee, should read:
-- Sumitomo Heavy Industries, Ltd. --

Signed and Sealed this

Sixth Day of April, 2004

JON W. DUDAS
*Acting Director of the United States Patent and Trademark Office*